(12) United States Patent
Ward

(10) Patent No.: US 6,503,039 B2
(45) Date of Patent: Jan. 7, 2003

(54) OFF-SET ADJUSTING NUT

(75) Inventor: Michael E. Ward, Geneva, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/735,134

(22) Filed: Dec. 12, 2000

(65) Prior Publication Data

US 2002/0071740 A1 Jun. 13, 2002

(51) Int. Cl.7 .................................................. F16B 35/04
(52) U.S. Cl. .................... 411/427; 411/398; 280/86.753
(58) Field of Search ................................ 411/398, 427; 280/86.753

(56) References Cited

U.S. PATENT DOCUMENTS

| | | | |
|---|---|---|---|
| 745,531 A | * | 12/1903 | Sholes |
| 843,656 A | * | 2/1907 | Andersen |
| 858,394 A | * | 7/1907 | Hutton |
| 1,156,798 A | * | 10/1915 | Meaker |
| 3,006,443 A | * | 10/1961 | Siler |
| 4,103,719 A | | 8/1978 | Witt |
| 4,753,454 A | | 6/1988 | Woehler |
| 4,971,352 A | | 11/1990 | Jordan |
| 5,163,699 A | | 11/1992 | Specktor |
| 5,382,043 A | | 1/1995 | Jordan |
| 5,413,008 A | | 5/1995 | Brock |
| 5,767,598 A | | 6/1998 | Kano et al. |
| 5,901,447 A | | 5/1999 | Dunning |

OTHER PUBLICATIONS

"Wheel Alignment Service Procedure".
"Wheel Alignment".

* cited by examiner

*Primary Examiner*—Flemming Saether
(74) *Attorney, Agent, or Firm*—Mark W. Croll; Paul F. Donovan

(57) ABSTRACT

An off-set adjusting nut for use with a bolt permits adjusting at least one characteristic of mechanically connected members. The bolt has a head and a shank extending therefrom, at least a portion of the shank being threaded for engagement with the adjusting nut. The adjusting nut includes a body defining a nut axis therethrough. The body further defines an upper surface and a lower portion. A round flange is formed integral with the body at the lower portion. The flange is formed on the body collinear with the nut axis. An eccentric bore is formed in the body extending from the upper surface to the lower portion and through the flange. The bore has a thread formed therein for engaging the bolt shank thread. The bore is formed off-set in the nut body and defines a bore axis that is parallel to and spaced from the nut axis.

9 Claims, 2 Drawing Sheets

OFF-SET ADJUSTING NUT

BACKGROUND OF THE INVENTION

The present application relates to an adjusting assembly for bolted members. More particularly, the present invention relates to an off-set nut for use in an adjustable assembly for bolted members.

Mechanical assemblies such as those used in automobile steering systems often require alignment and adjustment. These assembled (e.g., bolted) components generally use slotted openings, cam surfaces and specially manufactured components to provide such adjusting capabilities. In one use of such an adjusting assembly, automobile wheel alignment is carried out to maximize steering performance and to provide proper road handling and tire wear.

Desired wheel alignment varies according to particular automobile manufacturers and models and may be further dependent upon external conditions such as rubber and oil accumulation around the joined parts and weather conditions. Typically, automobile alignment involves two parameters, namely, caster and camber. Caster is commonly recognized as the angle between the steering kingpin axis and the vertical. This can be seen when taking a side view of the automobile; that is, looking directly at the side of the automobile wheel. Camber is defined as the amount that the automobile tires tilt at the top relative to the bottom. This is recognized as inwardly or outwardly tilted when viewed from the front of the automobile. As a result of wear, as well as road conditions, rubber and oil accumulation and the like, caster and camber measurements change during the life of the automobile. This results in needed, periodic wheel alignment. These alignments are made within specified manufacturer tolerances.

Currently used arrangements for providing the adjustment necessary for wheel alignment use custom bolts, such as cam bolts or knuckle bolts to provide the necessary adjustment. In one arrangement, as shown in FIG. 1, a knuckle bolt or cam bolt 1 is fitted into a slotted opening 2 in the steering assembly 3. The bolt 1 includes an off-set flange 4 that serves as a camming surface. As the bolt 1 is rotated, the off-set flange 4 cooperates with a stationary surface 5 to move the bolt 1 transversely through the slotted opening 2. A nut 6 is then threadedly engaged on the bolt 1 shaft to secure the bolt 1 in the transverse position as set using the off-set flange 4 camming surface.

FIG. 2 illustrates a second arrangement in which a cam bolt 7 is inserted through an elongated slot 8 and an off-set or camming washer 9 is positioned on the bolt 7 shaft. The camming washer 9 includes an off-set slot 10 through which the bolt 7 inserts. The cam bolt 7 has a flat surface 11 extending along the length thereof that cooperates with the slot 10 in the washer 9. As the bolt 7 is rotated, it consequently rotates the washer 9 which functions as a cam to move the bolt 7 transverse to the direction of fastening. A nut 12 is then threaded onto the shaft of the cam bolt 7 and tightened to maintain the assembly in place.

These known adjusting arrangements both require specially manufactured bolts for providing this adjusting feature. In addition, because the overall steering assembly arrangements vary greatly from one vehicle to the next, a wide variety of these specially manufactured bolts are necessary in order to provide the specified parts for each vehicle. Moreover, in the arrangement illustrated in FIG. 2, multiple parts, i.e., specially manufactured bolts and washers, as well as nuts are necessary in order to provide this adjustment feature, again for individual or differing steering assembly arrangements. Furthermore, in this arrangement, it has been found that because the bolt typically has a small driving hex, the torque adjustment on the assembly is limited.

Accordingly there exists a need for adjusting assembly components that minimize the differing number of parts necessary for different vehicles. Desirably, such adjusting assembly components utilize a maximum number of standard or conventional parts and require a minimum number of specially manufactured and/or designed parts. Most desirably, these differing parts are usable with a variety of steering assemblies thus, requiring a minimum inventory of differing parts.

BRIEF SUMMARY OF THE INVENTION

An off-set adjusting nut is configured for use with a bolt for adjusting at least one characteristic of mechanically connected members. A common bolt is used which has a head and a shank extending therefrom. At least a portion of the shank is threaded for engagement with the adjusting nut. The adjusting nut provides for mechanical fastening of components to one another in which transverse (i.e., side-to-side) positioning of the fastening assembly is required.

The nut includes a body portion that defines a nut axis therethrough. The body further defines an upper surface and a lower portion. A round flange is formed integral with the body at the lower portion. The flange is formed on the body such that the nut axis is collinear with an axis of the flange.

A bore is formed in the nut body extending from the upper surface to the lower portion and through the flange. The bore has a thread formed therein for engaging the thread of the bolt shank. The bore is formed off-set in the nut body and defines a bore axis that is parallel to and spaced from the nut axis. The nut axis can lie within the nut bore. Alternately, to provide a greater range of adjustment, the nut axis can lie on a wall defining the bore. Still alternately, to provide an even greater range of adjustment, the nut axis can lie outside of the bore.

When the adjusting nut and bolt are engaged with one another, rotation of the adjusting nut moves the adjusting nut and bolt in a direction transverse to a direction of engagement, i.e., side-to-side, by a camming action. Rotation of the bolt head moves the adjusting nut and bolt in the direction of engagement, i.e., tightening and loosening.

In a preferred embodiment, the nut body defines a hexagonal shape. In this configuration, the nut body defines a largest dimension across opposing apices of the hexagonal shape. The flange can have a diameter equal to the largest dimension across the opposing apices. Alternately, the flange can have a diameter greater than the largest dimension across the opposing apices.

The walls that define the bore are circular and can be beveled at a juncture with the upper surface. The bore defining wall at a juncture with the lower portion at the flange can also be beveled.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
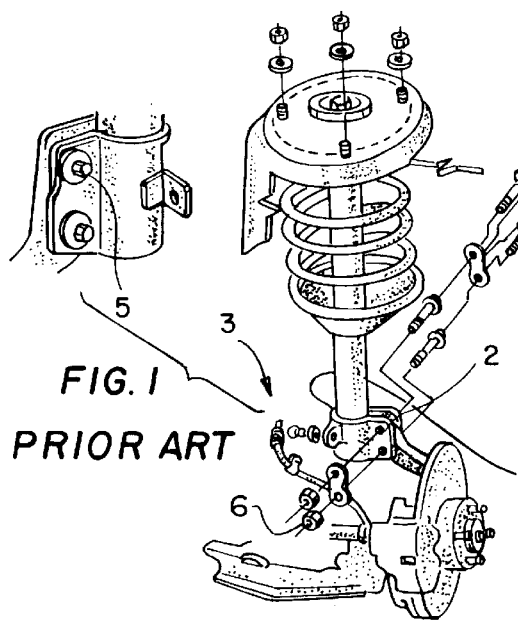
FIG. 1 is a schematic view of one known wheel adjustment aligning assembly, this assembly being common among automobiles manufactured by Chrysler Corporation.
Figure 2:
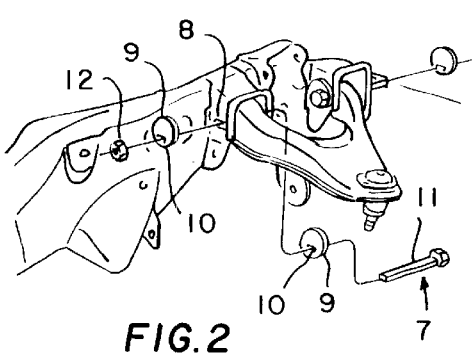
FIG. 2 is a schematic view of a second known wheel alignment adjusting assembly which assembly is commonly found on General Motors automobiles.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated. It should be further understood that the title of this section of this specification, namely, "Detailed Description Of The Invention", relates to a requirement of the United States Patent Office, and does not imply, nor should be inferred to limit the subject matter disclosed herein.

Figure 6A:
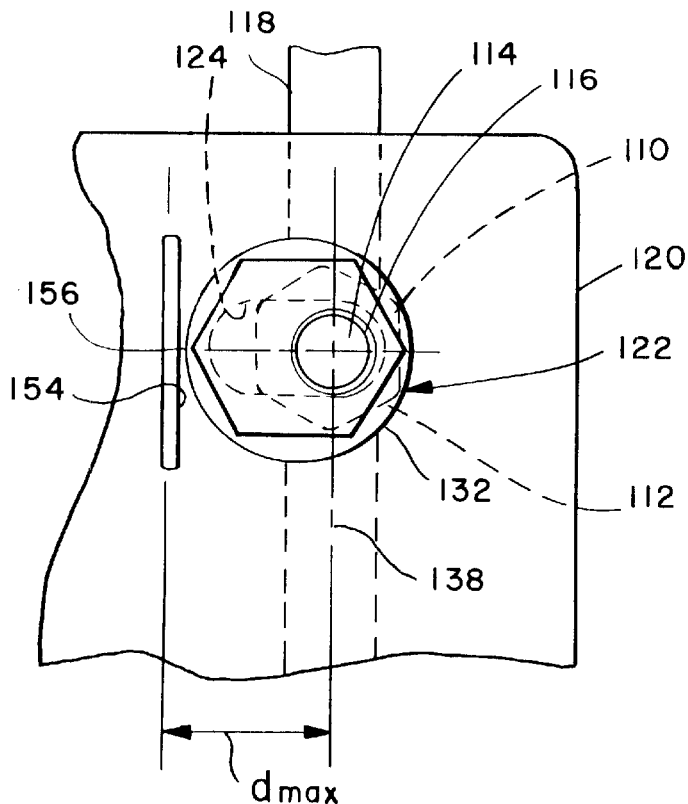
FIGS. 6A and 6B illustrate the range of adjusting capability of the embodiment of the off-set adjusting nut of FIGS. 3A–3C.
Figure 6B:
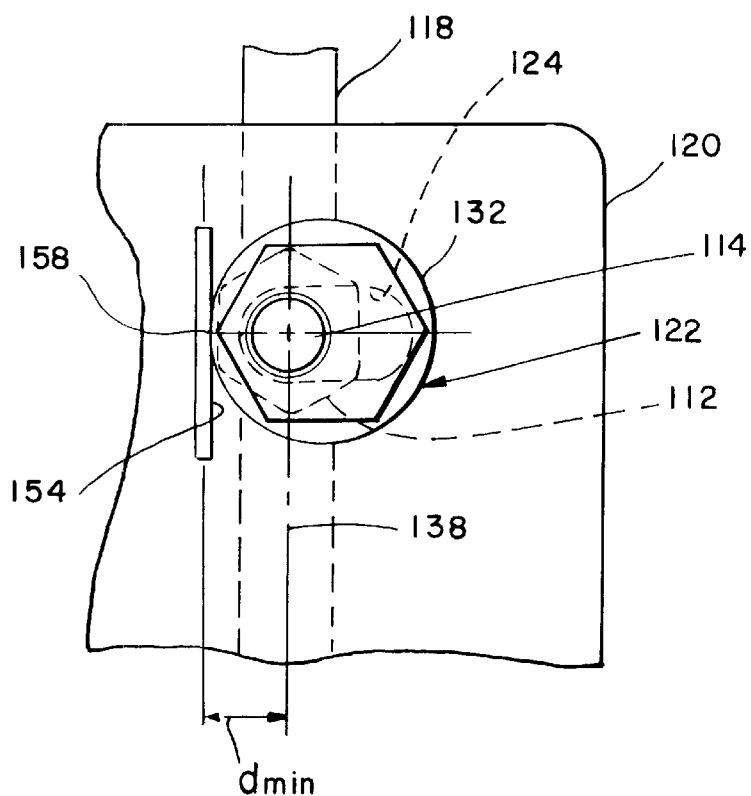

An adjusting assembly in accordance with the principles of the present invention provides for mechanical fastening of components to one another in which controlled, precise transverse positioning (i.e., side-to-side positioning) of the fastening assembly is required. As seen in FIGS. 6A–B, in use in a typical arrangement, for fastening two components to one another, such as a steering knuckle to a strut assembly or portions of a steering assembly to one another, an adjusting nut in accordance with the principles of the present invention provides for adjusting these components relative to one another to, for example, facilitate wheel alignment.

A conventional bolt 110 having a head 112 and a shaft or shank 114 includes a threaded portion 116 at an end of the shank 114 opposite the head 112. The bolt 10 is inserted through first and second members 118, 120 that are fastened to one another. An adjusting nut 122 in accordance with the principles of the present invention is threaded onto the threaded end 116 of the bolt shank 114 and tightened thereon. The components 118, 120 that are fastened to one another are adjustable, transverse to the direction of engagement (i.e., side-to-side adjustment) by an elongated notched or slotted opening 124 formed in one of the members, such as member 120, to permit transverse adjustment as the members 118, 120 are fastened together.

The off-set adjusting nut 122 includes a body 126 defining an axis, as indicated at 128, therethrough. A camming surface 130 is formed as part of the body 126 generally symmetrical relative to the nut axis 128. In a current embodiment, the nut body 126 has a hexagonal shape, which shape (i.e., a hex nut) is commonly used in mechanical fastening assemblies. The camming surface 130 can be configured as a flange 132 that is formed integral with the body 126 and is also symmetrical relative to the nut axis 128. That is, the flange 132 is round and its axis 134 is collinear with the nut axis 128. As such, it is to be understood that any reference to the nut axis 128 by necessity includes or encompasses the flange axis 134.

In a present embodiment, in which the body 126 defines a hexagonal shape, a largest dimension across opposing apices of the hexagonal shape is defamed. The flange 132 can have a diameter equal to this largest dimension. Alternately although not shown, the flange 132 can have a diameter greater than this largest dimension across the opposing apices.

An eccentric bore 136 is formed through the body 126, which bore 138 defines a bore axis, as indicated at 138. The bore 136 is formed off-center in the body 126 such that the bore axis 138 and the nut axis 128 are non-collinear, or are spaced from one another as indicated at $S_{122}$. In a typical configuration, the 136 bore is threaded, as indicated at 140, for threadedly engaging the mating threads 116 on the bolt 110. In this manner, the nut 122 engages the bolt 110 in an eccentric manner such that the bolt 110 and nut 124 thread together asymmetrically.

The bore 136 can be configured having beveled or angled walls 142, 144 at the upper end and lower portion, respectively, to permit readily engaging the nut 122 with the bolt 110. The beveled ends 142, 144 also facilitate forming or machining the threads 140 in the nut 122 and further permit cleaning the threads 140 after formation.

Figure 3C:
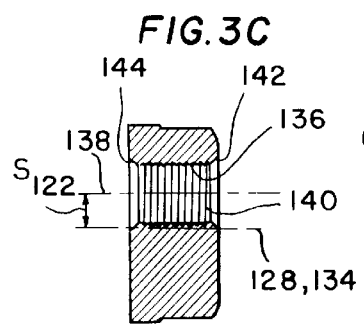
FIGS. 3A–3C illustrate a top view (FIG. 3A), a side view (FIG. 3B) and a cross-sectional view taken along line 3C—3C (FIG. 3C) of one embodiment of an off-set adjusting nut embodying the principles of the present invention.
Figure 3A:
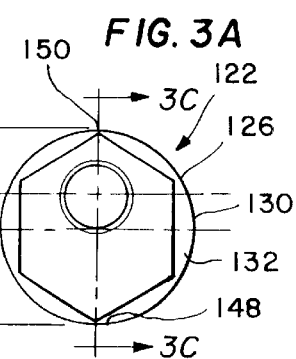
Figure 3B:
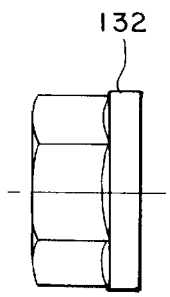
Figure 4C:
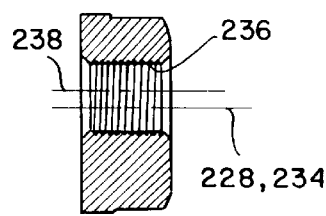
FIGS. 4A–4C are top, side, and cross-sectional views, similar to FIGS. 3A–3C, of an alternate embodiment of an off-set adjusting nut.
Figure 4A:
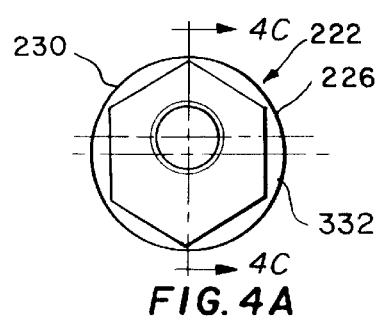
Figure 4B:
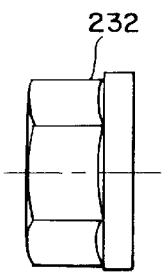
Figure 5C:
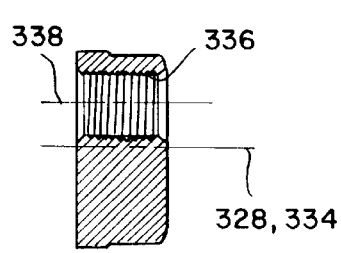
FIGS. 5A–5C are top, side, and cross-sectional views, similar to FIGS. 3A–3C, of still another alternate embodiment of an off-set adjusting nut.
Figure 5A:
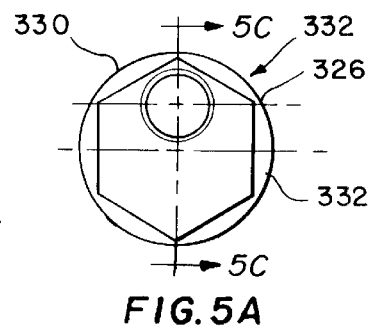
Figure 5B:
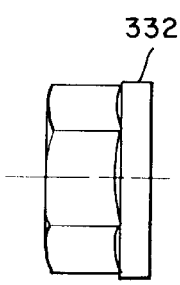

The bore 136 can be formed in the nut 122 at various positions. As seen in FIGS. 3A–3C, the bore 136 can be formed such that the wall 146 that defines the bore 136 (e.g., at the threads 140) lies substantially along the nut axis 128. Alternately, as illustrated in FIGS. 4A–4C, the nut 224 can be configured such that the nut axis 228 lies within the bore 236, off-set from the bore axis 238. Alternately still, as seen in FIGS. 5A–5C, the nut 322 can be formed such that the wall 346 that defines the bore 336 (e.g., at the threads 340) is spaced from the nut axis 328.

As will be appreciate by those skilled in the art, and as will be described in detail below, the greater the distance $d_{122}$ between the bore axis 138 and the nut axis 128 the greater the adjusting capabilities of the nut 122. This is, of course, because a greater distance between the nut axis 128 the bore axis 138, results in a greater difference between the largest and smallest distances $d_l$, $d_s$ (as seen in FIG. 3A) between the bore axis 138 and the edges of the flange as indicated at 148 and 150, respectively.

Referring now to FIGS. 6A and 6B, there is shown a schematic illustration of how the present off-set nut 122 provides this adjustment capability. The nut 122 and associated bolt 110 are shown positioned within a portion of steering linkage member 118, 120. These portions can, for example, be a portion of the steering knuckle 118 and a portion of a bracket 120 extending from the front wheel strut. The steering assembly portions correspond to those portions shown in FIG. 1. In that the steering knuckle 118 and strut bracket 120 are to be mounted to one another using the present adjusting nut 122, the steering knuckle includes a round opening (not shown) formed therein through which the bolt 110 inserts. The strut bracket 120 includes an elongated slot 124 also through which the bolt 110 inserts. A stationary surface 154 is formed on the bracket 120 against which the nut flange 132 rests to provide the adjusting capability by a camming action.

For purposes of the follow description, it is to be understood that the because the opening in the knuckle 118 is fixed (i.e., round), the position of the bolt 110 corresponds to the position of the knuckle 118. That is, the bolt 110 and knuckle 118 move together. Referring to FIG. 6A, the assembly is shown with the nut 122 positioned to rest in a first position in which the steering knuckle 118 is farthest from the stationary surface 154 on the strut bracket 120. This is accomplished by threading the nut 122 onto to the bolt 110, and rotating the nut 122 so that a first flange portion 156, farthest from the bore axis 138 is positioned abutting the stationary surface 154. In this position, the bolt 110 (and thus the knuckle 118) are at a farthest position relative to the bracket 120. This provides a maximum adjusting distance $d_{max}$ capability. It is merely necessary to then tighten the bolt 110 (rather than tightening the nut 122) while maintaining the nut 122 stationary to fix this knuckle/bracket 118/120 position.

Conversely, as shown in FIG. 6B, rotating the nut 122 one hundred eighty degrees (180°) relative to the position of FIG. 6A, positions a second flange portion 158 on the stationary surface 154. In this position, the bolt 110 (and thus the knuckle 118) are at a closest position relative to the bracket 120. This provides a minimum adjusting distance $d_{min}$ capability. Again, it is merely necessary to then tighten the bolt 110 (rather than the nut 122) while maintaining the 122 nut stationary to fix this knuckle/bracket 118/120 position. It will be readily understood that because of the curved or round periphery of the flange 132, the adjustments capable within the range of adjustments (i.e., $d_{max}$–$d_{min}$) are continuous, rather than at discrete steps.

As will be recognized and appreciated by those skilled in the art, the present adjusting nut 122 permits wheel alignment adjustments without the need for specialized bolts, washers and the like. Rather, with a common bolt 110 (within manufacturer's specifications and tolerances), the present adjusting nut 122 provides for continuously adjusting the distance between, for example, a steering knuckle 118 and its associated strut bracket 120.

As set forth above, the position of the bore axis 138 relative to the nut axis 128 determines the overall adjusting capability for the nut 122. FIGS. 4A,C and 5A,C illustrate the relationship between the location of the bore axis and the nut axis, and the resulting range of adjustment capabilities. As can be seen from FIGS. 4A when the nut axis 228 lies within the bore 236 (i.e., when the nut and bore axes 228, 238 are close to one another), the resulting adjusting capability is relatively small. Conversely, as seen in FIG. 5A when the bore axis 338 is at a greater distance from the nut axis 328, the adjustment capability of the off-set nut 322 is increased.

In the present disclosure, the words "a" or "an" are to be taken to includes both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limination with respect to the specific embodiments illustrated is intended or should be inferred. The disclosure is intended to cover by the appended claims all such modification as fall within the scope of the claims.

What is claimed is:

1. An off-set adjusting nut in combination with an associated bolt for adjusting the position of an associated mechanically connected member relative to a second member, said second member having a stationary surface and a slot extending therethrough, the bolt having a head and a shank extending therefrom, at least a portion of the shank extending through the slot in the second member, and at least a portion of the shank being threaded for engagement with the adjusting nut, the adjusting nut comprising:

a body defining a nut center axis therethrough, the body further defining an upper surface and a lower portion;

a round flange formed integral with the body at the lower portion thereof, the flange being formed on the body wherein the nut center axis is collinear with center axis of the flange; and a bore formed in the body extending from the upper surface to the lower portion and through the flange, the bore having a thread formed therein for engaging the bolt shank thread, the bore being formed off-set in the nut body and defining a bore axis that is parallel to and spaced from the nut center axis, wherein when the adjusting nut and bolt are engaged with one another, rotation of the adjusting nut moves the adjusting nut and bolt in a direction transverse to a direction of engagement by a camming engagement between the flange with the stationary surface, such that the bolt moves within the slot and said mechanically connected member moves transversely relative to said second member, and wherein rotation of the bolt head moves the adjusting nut and bolt in the direction of engagement to tighten the bolt to the adjusting nut.

2. The off-set adjusting nut in accordance with claim 1 wherein the nut axis lies within the nut bore.

3. The off-set adjusting nut in accordance with claim 1 wherein the nut axis lies on a wall defining the bore.

4. The off-set adjusting nut in accordance with claim 1 wherein the nut axis lies outside of the bore.

5. The off-set adjusting nut in accordance with claim 1 wherein the bore is defined by a circular wall and the bore wall is beveled at a juncture with the lower portion at the flange.

6. The off-set adjusting nut in accordance with claim 1 wherein the bore is defined by a circular wall and the bore wall is beveled at a juncture with the upper surface.

7. An off-set adjusting nut for use with an associated bolt for adjusting at least one characteristic of associated mechanically connected members, one of the mechanically connected members having a stationary surface, the bolt having a head and a shank extending therefrom, at least a portion of the shank being threaded for engagement with the adjusting nut, the adjusting nut comprising:

a hexagonal-shaped body defining a nut axis therethrough, the body further defining an upper surface and a lower portion;

a round flange formed integral with the body at the lower portion thereof, the flange being formed on the body wherein the nut axis is collinear with an axis of the flange; and a bore formed in the body extending from the upper surface to the lower portion and through the flange, the bore having a thread formed therein for engaging the bolt shank thread, the bore being formed off-set in the nut body and defining a bore axis that is parallel to and spaced from the bore axis, wherein when the adjusting nut and bolt are engaged with one another, rotation of the adjusting nut moves the adjusting nut and bolt in a direction transverse to a direction of engagement by camming engagement with the stationary surface, and wherein rotation of the bolt head moves the adjusting nut and bolt in the direction of engagement.

8. The off-set adjusting nut in accordance with claim 7 wherein the nut body defines a largest dimension across opposing apices of the hexagonal shape, and wherein the flange has a diameter equal to the largest dimension across the opposing apices.

9. An off-set adjusting nut for use with an associated bolt for adjusting at least one characteristic of associated mechanically connected members, one of the mechanically connected members having a stationary surface, the bolt having a head and a shank extending therefrom, at least a portion of the shank being threaded for engagement with the adjustment nut, the adjusting nut comprising:

a body having a multi-sided, non-circular outer surface, the body defining a nut center axis therethrough, and the body further defining an upper surface and a lower portion;

a round flange formed integral with the body at the lower portion thereof, the flange being formed on the body wherein the nut center axis is collinear with center axis of the flange; and a bore formed in the body extending from the upper surface to the lower portion and through the flange, the bore having a thread formed therein for engaging the bolt shank thread, the bore being formed off-set in the nut body and defining a bore axis that is parallel to and spaced from the nut center axis, wherein when the adjusting nut and bolt are engaged with one another, rotation of the adjusting nut moves the adjusting nut and bolt in a direction transverse to a direction of engagement by camming engagement with the stationary surface, and wherein rotation of the bolt head moves the adjusting nut and bolt in the direction of engagement.

* * * * *